Figure 1:
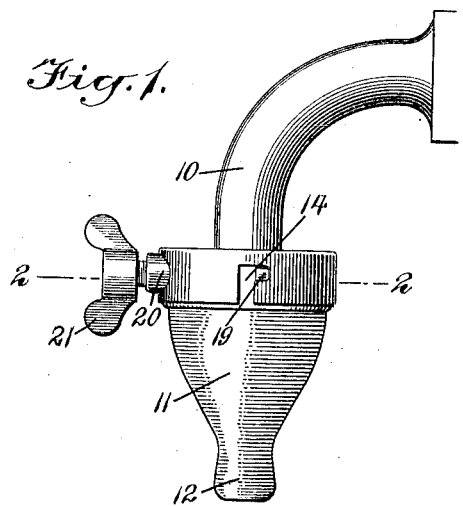

P. F. ZIETLOW.
FAUCET CONNECTION.
APPLICATION FILED AUG. 20, 1912.

1,048,381.

Patented Dec. 24, 1912.

WITNESSES
Geo. W. Naylor
Geo. L. Beeler

INVENTOR
Paul F. Zietlow.
BY
ATTORNEYS

UNITED STATES PATENT OFFICE.

PAUL F. ZIETLOW, OF NEW YORK, N. Y., ASSIGNOR TO TRIPLEX MFG. CO., OF BROOKLYN, NEW YORK.

FAUCET CONNECTION.

1,048,381.  Specification of Letters Patent.  Patented Dec. 24, 1912.

Application filed August 20, 1912. Serial No. 715,971.

*To all whom it may concern:*

Be it known that I, PAUL F. ZIETLOW, a citizen of the United States, and a resident of the city of New York, borough of Brooklyn, in the county of Kings and State of New York, have invented a new and Improved Faucet Connection, of which the following is a full, clear, and exact description.

This invention relates to connections for water spigots and particularly to spigots adapted for connection with shower bath or bath spray apparatus.

Among the objects of the invention is to provide a device of the character indicated, whereby a hose connection or the like will be made to spigots or reducers of various sizes, without the necessity of making any substitution or alteration in the connection.

The foregoing and other objects of the invention will hereinafter be more fully described and claimed and illustrated in the drawings accompanying this specification in which like characters of reference indicate corresponding parts in all the views, and in which—

Figure 2:
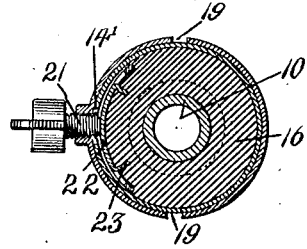
Figure 3:
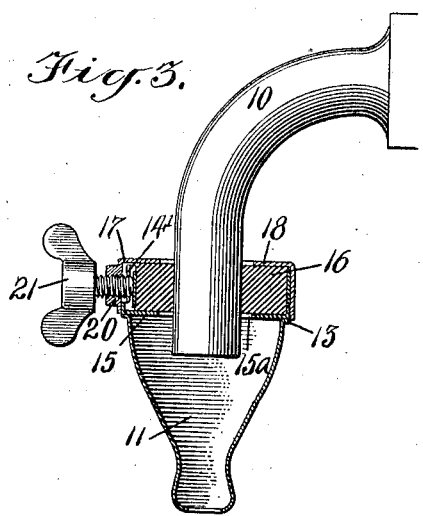
Figure 4:
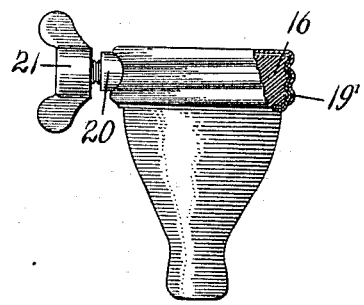

Figure 1 is a side elevation of the connection in place; Fig. 2 is a transverse section on the line 2—2 of Fig. 1; Fig. 3 is a vertical section; and Fig. 4 is a view showing a slight modification.

Referring particularly to the drawings I show at 10 a spigot of any suitable construction or size and to which is to be connected a piece of tubing or the like for the conveyance of water or other fluid to any desired place. At 11 is shown a discharge member body or cone, the lower end 12 of which is supposed to receive a section or length of tubing. The upper portion of the cone is bent outwardly at 13 and thence upwardly, forming a substantially cylindrical section or portion 14. The shoulder formed by the outward extension 13 constitutes a support for a flange 15 having a central opening 15ª large enough to accommodate the largest possible form of spigot likely to be used in connection with the connector. Within the cylindrical portion 14 of the cone is housed a thick flexible gasket 16 of rubber or the like which rests snugly upon the flange 15 whereby it is prevented from being displaced downwardly within the cone when the connector is being attached to the spigot. The hole through the center of the gasket is supposed to be small enough so as to approximately fit the smallest spigot likely to be fitted, but if the spigot should be smaller than the hole, compression may be applied to the gasket in any suitable way so as to compress it upon and thereby clamp the connector to the spigot.

A cap 17 is fitted upon the outer surface of the portion 14 and having an inwardly extending flange 18 substantially houses the gasket 16 between the flanges 18 and 15. The cap may be secured in place upon the cone by a bayonet joint indicated at 19, or it may be connected as indicated in Fig. 4 by the screw threads 19', the only essential in this respect being that the cap may be readily applied to or removed from the cone and when in place will be held snugly thereon. It will be noted, however, that in either form of the invention the cap is placed upon the cone and is removable therefrom by a movement including at least a partial rotation. The cap is also provided with a boss 20 through which is tapped a thumb screw 21 adapted to project through an opening 14' in the cylindrical part of the cone and thereby serve not only as a lock for the cap, but also to form a means for compressing the gasket into binding contact with the spigot.

As shown particularly in Fig. 2 the inner end of the screw 21 impinges upon a short metal plate 22 which surrounds a portion of the gasket and provided preferably with tongues 23 which project into the body of the gasket, whereby the plate and gasket are secured together when the other parts are separated. By virtue of the plate 22 and the operation of the screw 21, the gasket may be caused to bind tightly upon various sizes of spigots without any alteration or substitution of the parts.

The screw acting as a locking means for the cap prevents the cap from rotation upon the cone and its unauthorized displacement therefrom. The width of the stop 14' in the top of the cone is such that in order to unlock the bayonet joint so that the cap may be lifted from the cone, the screw 21 must be withdrawn from said slot so as to allow sufficient rotation of the cap for the purpose indicated.

A device made in accordance with this invention is simple in construction and manner of operation, and hence is reliable and satisfactory for practical use.

The parts of the device may be made of any suitable materials, and the relative sizes and proportions and the details of construction may be varied to a certain extent without departing from the spirit of the invention.

Having thus described my invention, what I claim as new and desire to secure by Letters Patent, is:—

1. In a faucet connection, the combination with a spigot, of a discharge member, a cylindrical gasket within the discharge member, said gasket being thick axially and diametrically, means to hold the gasket firmly in position with relation to the discharge member, and compression means coöperating with the gasket serving to bind the same and the discharge member snugly upon the spigot, said compression means including a plate within the discharge member applied to the periphery of the gasket and a screw having threaded engagement with said gasket holding means and operating upon said plate.

2. In a faucet connection, the combination with a spigot, of a cone, a gasket within the cone adapted to receive said spigot, means including a cap to secure the gasket firmly in place with respect to the spigot and cone, and compression means to cause said gasket to snugly clamp and fit the spigot irrespective of the diameter of the spigot, said compression means comprising a plate applied to the periphery of the gasket, said plate having a plurality of spurs extending thence into the body of the gasket and a thumb screw operating through said cap and the wall of the cone and impinging against the outer surface of said plate, substantially as set forth.

3. The herein described faucet connection comprising a cone, the upper portion of which is outwardly bent forming a shoulder and thence extending cylindrically, a flange within the cone seated upon said shoulder, a gasket within the cylindrical portion of the cone and supported upon said flange, a cap embracing said cylindrical portion of the cone and having a flange parallel to the aforesaid flange and embracing the gasket, said cap being placed upon the cone by a movement including certain rotation, and compression means for the gasket including means passing through the cap and cone and preventing relative rotation therebetween.

4. In a faucet connection, the combination with a spigot, of a cone having an outwardly turned portion forming a shoulder and extending thence upwardly cylindrically, said cylindrical portion having a vertical slot, a flange seated upon said shoulder, a gasket adapted to be fitted to said spigot and seated upon said flange, a cap embracing the upper portion of the gasket and the cylindrical portion of the cone, a bayonet joint connection being provided between the cap and the cone, an arc-shaped plate surrounding one side of the gasket and connected thereto within the slotted portion of the cylindrical part of the cone, and a compression screw carried by the cap and extending through said slot and adapted to bind the gasket firmly to the spigot and to prevent the disconnection of the bayonet joint, substantially as set forth.

In testimony whereof I have signed my name to this specification in the presence of two subscribing witnesses.

PAUL F. ZIETLOW.

Witnesses:
W. A. COCHRAN,
RUTH NEAL.

---

Copies of this patent may be obtained for five cents each, by addressing the "Commissioner of Patents, Washington, D. C."